United States Patent [19]

Nakada et al.

[11] Patent Number: 5,334,297

[45] Date of Patent: Aug. 2, 1994

[54] METHOD FOR PRODUCTION OF COLORED ARTICLE OF ALUMINUM OR ALUMINUM ALLOY

[75] Inventors: Norio Nakada, Toyama; Hideo Fukui, Kurobe; Hatsuo Hirono, Toyama; Seishiro Ito, Ikoma, all of Japan

[73] Assignee: Yoshida Kogyo K.K., Tokyo, Japan

[21] Appl. No.: 119,559

[22] Filed: Sep. 13, 1993

Related U.S. Application Data

[63] Continuation of Ser. No. 954,343, Sep. 30, 1992, abandoned.

[30] Foreign Application Priority Data

Sep. 30, 1991 [JP] Japan ................................. 3-276490

[51] Int. Cl.$^5$ ............................................. C25D 13/04
[52] U.S. Cl. ................................. 204/181.2; 205/173
[58] Field of Search ...................... 204/181.2; 205/172, 205/173, 175

[56] References Cited

U.S. PATENT DOCUMENTS

| | | | |
|---|---|---|---|
| 3,622,473 | 11/1971 | Ohta et al. | 205/172 |
| 3,718,548 | 2/1973 | Paulet et al. | 204/181.2 |
| 3,844,908 | 10/1974 | Matsuo et al. | 205/173 |
| 4,221,640 | 9/1980 | Shibata et al. | 205/175 |
| 4,310,586 | 1/1982 | Sheasby et al. | 205/173 |
| 5,237,618 | 8/1993 | Bethel | 381/71 |

FOREIGN PATENT DOCUMENTS

| | | |
|---|---|---|
| 51-35177 | 9/1976 | Japan . |
| 52-5010 | 2/1977 | Japan . |
| 203795 | 8/1988 | Japan . |
| 205093 | 8/1989 | Japan . |

*Primary Examiner*—John Niebling
*Assistant Examiner*—Kishor Mayekar
*Attorney, Agent, or Firm*—Hill, Steadman & Simpson

[57] ABSTRACT

A fast and brightly colored oxide film of aluminum which excels in durability and allows no separation of pigment is produced by using an aqueous dispersion of an organic pigment or carbon black finely divided to a size in the range between 3 and 150 nm, forming on a surface of an aluminum member an anodic oxide film containing pores larger in diameter than the ordinary pores, and causing the organic pigment or carbon black to migrate and deposit in the pores of the oxide film by means of electrophoresis. The formation of the anodic oxide film containing the pores larger in diameter than the ordinary pores is accomplished in the first method by subjecting the aluminum member to anodic oxidation at a high voltage in an aqueous solution of acid. In the second method, the anodic oxide film is subjected either to a treatment of immersion in an aqueous solution of at least one acid selected from among phosphoric acid, sulfuric acid, oxalic acid, and sulfamic acid or to a combination treatment of immersion and AC electrolysis repeated in a prescribed number of cycles in the solution, to enlarge the pores in the anodic oxide film.

6 Claims, 1 Drawing Sheet

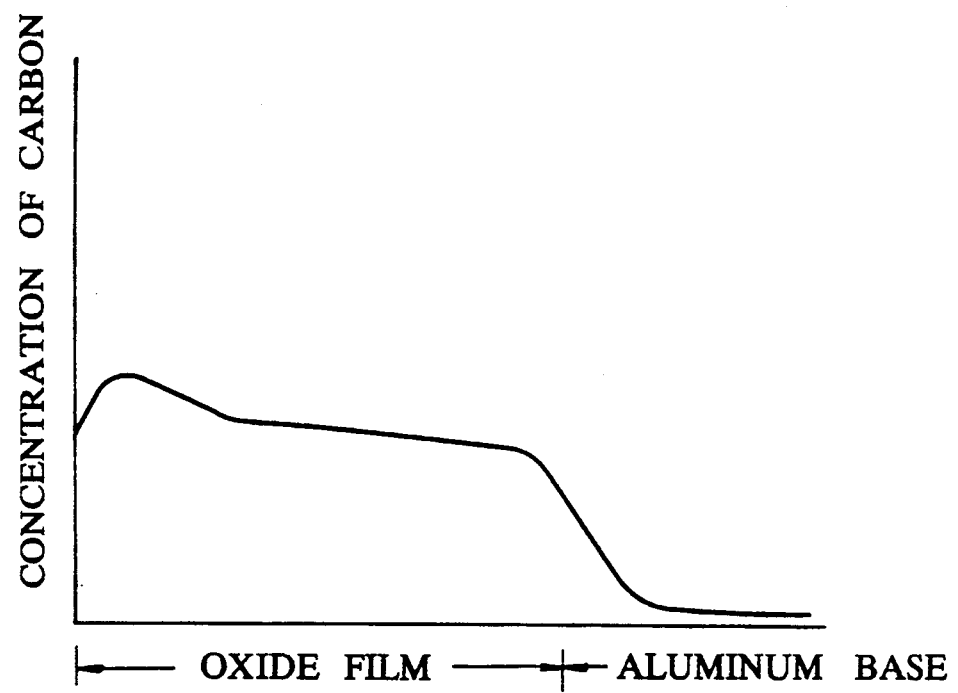

METHOD FOR PRODUCTION OF COLORED ARTICLE OF ALUMINUM OR ALUMINUM ALLOY

This is a continuation, of application Ser. No. 07/954,343, filed Sep. 30, 1992, now abandoned.

BACKGROUND OF THE INVENTION

1. Field of the Invention

This invention relates to a colored article of aluminum or an aluminum alloy (hereinafter referred to collectively as "aluminum") and a method for the production thereof. More particularly, this invention relates to a method for imparting a fast and bright color to an anodic oxide film of aluminum by filling the pores in the oxide film to the deepest recesses thereof with a high-quality organic pigment or carbon black.

2. Description of the Prior Art

Heretofore, as means for effecting the coloration of an anodic oxide film of aluminum, numerous methods centering around the method of electrolytic coloring process using various metallic salts-containing baths and also including the methods of immersion coloration which use the bath containing inorganic compounds or the bath containing organic dyes have been known. The method of electrolytic coloring process, however, produces a desired color only with difficulty and, therefore, imposes a limit on the kinds of colors to be obtained. The dyeing methods, though capable of effecting coloration as required, entail the disadvantage that the colored oxide films obtained thereby are deficient in durability. It has been held that these conventional techniques encounter extreme difficulty in obtaining a brightly and primarily colored oxide film of such qualities as to fulfill various durability properties which facing materials for buildings are required to possess.

As measures to solve these problems, Japanese Patent Publication No. SHO 52-5010 proposes a method for effecting the coloration of aluminum by subjecting aluminum to anodic oxidation in an aqueous phosphoric acid solution and immersing the treated aluminum in a bath of fine dispersion of an aqueous pigment thereby inducing adsorption of the pigment onto a porous anodic oxide film formed on the surface of aluminum or a method which further coats the colored aluminum obtained as described above with a thermosetting resin. Japanese Patent Publication No. SHO 51-35177 proposes a method for attaining the coloration of aluminum by immersing aluminum which has undergone anodic oxidation in a nonionic or nonionic-cationic bath of a fine dispersion of an aqueous organic pigment and passing a direct current or an alternating current through the aluminum in the bath thereby inducing adsorption of the pigment onto a porous anodic oxide film formed on the surface of aluminum or a method which further coats the colored aluminum obtained as described above with a thermosetting resin.

These patent publications teach that the fine dispersion of the pigment having a particle size falling in the neighborhood of 1 $\mu$m (1,000 nm), preferably not exceeding 0.5 $\mu$m (500 nm) is used. In the aqueous pigment dispersion which is commercially available today, the pigment particles have an average particle diameter in the range approximately between 200 and 300 nm. On the other hand, in the anodic oxide film for which the aqueous pigment dispersion in used, the pores distributed therein generally have diameters of not more than 50 nm. Since most pigment particles are larger in diameter than the pores in the oxide film, therefore, the coloration of aluminum occurs in such a manner that the pigment is deposited by adsorption in the form of a layer at the mouths of the pores in the anodic oxide film and on the surface of the oxide film. The colored and pore-sealed aluminum of such a method, therefore, poses a problem of poor fastness of the imparted color to the impact of abrasion and consequent ready release of the pigment and, moreover, entails the disadvantage that fast coloration is not obtained unless the colored oxide film is coated with resin as disclosed in the patent publications mentioned above.

SUMMARY OF THE INVENTION

An object of this invention, therefore, is to provide a colored article of aluminum which is freed from such drawbacks of the prior art as described above and which is endowed with an oxide film colored fast and brightly in a desired hue and enabled to acquire various durability properties which facing materials for buildings are required to possess and, at the same time, prevented from yielding to discoloration or decolorization.

A further object of this invention is to provide a method of producing a colored article of aluminum which is capable of depositing and filling a pertinent pigment in the deep recesses of the pores of the porous anodic oxide film of aluminum, thereby imparting a fast and bright color in a desired hue to the oxide film of aluminum.

To accomplish the objects described above, in accordance with a first aspect of this invention, there is provided a method of producing a colored article of aluminum, comprising the steps of anodizing aluminum at high voltage in the range between DC 60 V and 200 V in an aqueous solution of at least one mineral acid or organic acid thereby forming on the surface of the aluminum a porous anodic oxide film which contains pores having a diameter in the range between 20 and 200 nm, immersing the anodized aluminum in an aqueous dispersion of an organic pigment or carbon black finely divided into particles of a size in the range between 3 and 150 nm and dispersed in an aqueous medium, and then subjecting the anodized aluminum to an electrophoretic treatment to cause the organic pigment or carbon black to be migrated and deposited in the pores of the anodic oxide film thereby obtaining the colored article of aluminum.

In accordance with the second aspect of this invention, there is provided a method of producing a colored article of aluminum, comprising the steps of anodizing aluminum in an aqueous solution of at least one mineral acid or organic acid thereby forming a porous anodic oxide film on the surface of the aluminum, subjecting the anodized aluminum to a pore-widening treatment effected either by immersing the anodized aluminum in an aqueous solution of at least one acid selected from among phosphoric acid, sulfuric acid, oxalic acid, and sulfamic acid or by repeating a combination treatment of immersion and AC electrolysis in a prescribed number of cycles in said solution, thereby enlarging the pores in said porous anodic oxide film to a diameter in the range between 20 and 200 nm, subsequently immersing the anodized aluminum in an aqueous dispersion of an organic pigment or carbon black finely divided into particles of a size in the range between 3 and 150 nm and dispersed in an aqueous medium, and then subjecting the anodized aluminum to an electrophoretic treatment to cause the organic pigment or carbon black to be migrated and deposited in the pores of the anodic oxide film thereby obtaining the colored article of aluminum.

By making use of these methods, there can be provided a colored article of aluminum endowed with a colored oxide film produced by filling the pores in the porous anodic oxide film of the aluminum to the deepest recesses thereof with particles of an organic pigment or carbon black having diameters in the range between 3 and 150 nm.

BRIEF DESCRIPTION OF THE DRAWING

The drawing attached hereto is a graph of the line profile measured by the EPMA (electron prove X-ray micro analyser) of carbon in a colored oxide film obtained in Example 3 of this invention which will be described specifically herein below.

DETAILED DESCRIPTION OF THE INVENTION

In the belief that the production of a fast and brightly colored oxide film of aluminum excelling in such properties as lightfastness, weatherability, and heatproofness and allowing no separation of the deposited pigment requires the pigment for coloration to fill the pores in the porous anodic oxide film to the fullest possible depth, the present inventors have pursued a study on fine grinding of pigment particles and ample dispersion in water thereof, adjustment of the pores to be formed in the anodic oxide film and utilized for deposition of the pigment (treatment for enlarging the pores in diameter), and means for depositing the pigment in the pores to the deepest recesses thereof and, as a result of this study, perfected the colored article of this invention. Specifically, this invention attains a colored oxide film of aluminum possessing such ideal properties as mentioned above by using the aqueous solution of an organic pigment or carbon black finely divided into particles of a size in the range between 3 and 150 nm, forming on the surface of aluminum an anodic oxide film having pores larger in diameter than ordinary pores, and causing the aforementioned organic pigment or carbon black to be migrated and deposited in the pores of the oxide film by the electrophoretic process. Here, the formation of the anodic oxide film containing the pores larger in diameter than ordinary pores as described above is accomplished in the first method by anodizing aluminum at a high voltage in an aqueous solution of at least one mineral acid or organic acid and in the second method by forming a porous anodic oxide film on the surface of aluminum and then immersing the anodized aluminum in the aqueous solution of at least one acid selected from among phosphoric acid, sulfuric acid, oxalic acid, and sulfamic acid or subjecting it to a combination immersion and AC electrolysis treatment in a prescribed number of cycles in said solution thereby enlarging the pores in the aforementioned porous anodic oxide film. The enlargement of the pores in the anodic oxide film, however, must be restrained within the bounds in which the enlarged pores pose no problem in terms of strength and other properties.

Now, this invention will be described more specifically below. First, the high-grade pigment to be used as a coloring agent herein is a pigment of high quality which has attained a marked advance in recent years and which is excellent in tinting property and which has such durability properties as lightfastness, weatherability, heatproofness, and resistance to solvents. The pigments belonging to this category include condensed azo type pigments, phthalocyanine type pigments, and perylene type, perinone type, quinacridone type, thioindigo type, dioxazine type, isoindolinone type, isoindoline type, quinophthalone type, and metal complex type condensed polycyclic pigments, for example. These pigments are generally in the form of an aggregate of primary particles having a size in the range between 10 and 500 nm. It is very difficult for this aggregate to be dispersed into particles of the original size of primary particles. Further, these pigments have small surface polarity and encounter unusual difficulty in being dispersed in a stable state in polar solvents represented by water. The primary particles of these pigments have a diameter equal to or much larger than the diameter of the pores in the anodic oxide film of aluminum which is obtained by the conventional method. The particles of such a pigment, therefore, must be finely divided and dispersed to prepare a stable aqueous dispersion.

As regards the fine division and dispersion of pigment particles in an aqueous medium, it has been demonstrated that a stable aqueous dispersion of pigment particles is obtained by dispersing the pigment particles in the aqueous medium with a sand mill using as a dispersant an anionic high-molecular surface-active agent such as, for example, a formalin condensate of naphthalenesulfonic acid, polystyrene sulfonates, or polyacrylates. This aqueous dispersion is produced with better quality when the pigment is given a surface treatment such as with plasma prior to the dispersion with the sand mill. Most high-quality organic pigments are soluble in concentrated sulfuric acid. In the case of such a pigment, therefore, a method which comprises dissolving the pigment in concentrated sulfuric acid and adding the resultant solution to water thereby inducing precipitation therein of pigment particles of a smaller size may be adopted in addition to the method of dispersion mentioned above. By these methods, a stable aqueous dispersion of pigment particles having a diameter in the range between 3 and 150 nm, preferably between 3 and 100 nm, is prepared.

The anodic oxide film of aluminum provided with pores capable of allowing deposition therein of pigment must be such that the pores contained therein possess a diameter in the range between 20 and 200 nm, preferably between 50 and 150 nm. As a bath for the treatment of anodic oxidation, the aqueous solution of at least one acid selected from among mineral acids and organic acids such as, for example, sulfuric acid, phosphoric acid, oxalic acid, malonic acid, and maleic acid can be used. A bath formed mainly of the aqueous oxalic acid solution is preferred.

In the first method of this invention, the aluminum is anodized at a high voltage in the range between DC 60 V and 200 V, preferably between DC 150 V and 200 V in the aqueous solution of at least one acid selected from among the mineral acids and organic acids mentioned above to form on the surface of the aluminum a porous anodic oxide film whose pores have a diameter larger than the diameter of ordinary pores. As described above, the pores formed in the anodic oxide film which is produced by the ordinary treatment of anodic oxidation have a diameter of not more than 50 nm. It is, therefore, generally difficult for the aforementioned pigment to deposit and fill these pores, though depending on the particular magnitude of average diameter of the pigment. When the anodic oxidation is carried out at the high voltage, for example, in the range between DC 150 V and 200 V, the produced anodic oxide film contains pores having a diameter generally exceeding 120 nm. These pores are, therefore, capable of being deposited and substantially completely filled with the aforementioned pigment. If the voltage used in the treatment for anodic oxidation is lower than 60 V, the disadvantage arises that the pores, which are formed in the oxide film, do not have a large enough diameter for the desired deposition of and filling with the pigment. Conversely, if the voltage exceeds 200 V, the disadvantage ensues that the pores have an adverse effect on such physical properties of the anodic oxide film as the strength of the film.

In the second method of this invention, aluminum is first anodized in the aqueous solution of at least one acid selected from among the mineral acids and organic acids mentioned above to form a porous anodic oxide film on the surface of aluminum. By adopting a high voltage exceeding 35 V, preferably in the range between 50 and 160 V, for the electrolysis involved in the treatment, the anodic oxide film to be produced is allowed to acquire a large cell size and a large pore diameter. Then, the anodized aluminum is immersed in the aqueous solution of at least one acid selected from among phosphoric acid, sulfuric acid, oxalic acid, and sulfamic acid, preferably in the aqueous solution containing phosphoric acid in a concentration in the range between 3 and 10 W/V %, to enlarge the pores in the anodic oxide film eventually to a diameter in the range between 20 and 200 nm, preferably between 50 and 150 nm, and obtain the anodic oxide film fit for the coloration aimed at by this invention (pore-widening treatment). The time to be used for the treatment of enlarging the pores in the oxide film can be decreased comparatively by alternately repeating the immersion in the aforementioned aqueous solution of acid, preferably in the aqueous solution containing phosphoric acid in a concentration in the range between 3 and 10 W/V %, and AC electrolysis at brief intervals. In general the time of immersion is desired to be longer than that of AC electrolysis and the AC electrolysis is desired to be carried out at a voltage of not more than 20 V. When the AC electrolysis is carried out at a lower voltage, the time thereof may be prolonged. It is preferable that the load of AC electrolysis per one cycle does not exceed 20 V-min., though depending on the temperature of electrolyte to be used. In any case, the application of AC electrolysis should be restrained within the bounds in which the breakage of the anodic oxide film does not occur.

In the process of coloration, the electrophoretic treatment, which is performed in the aqueous dispersion of a high-grade organic pigment or carbon black using as an anode the aluminum to be pigmented which aluminum is endowed with the aforementioned anodic oxide film, induces deposition of the dispersed pigment in the pores of the anodic oxide film to the deepest recesses thereof and gives birth to a brightly colored film. The methods which are effectively usable for the electrophoresis include the DC voltage scanning method which consists in shifting a DC voltage from a low voltage to a high voltage, for example, from 0 V to a voltage in the range between 1 and 200 V, at a fixed voltage increasing rate, preferably at the rare of from 0.1 to 5 V/sec. until a desired color is produced and the DC constant-voltage method which consists in continuing electrolysis at a constant voltage, preferably at a voltage between 1 and 200 V until the desired color is obtained, for example. The combination of the DC voltage scanning method and the DC constant-voltage method may be used for the electrophoresis.

The anodic oxide film colored in accordance with the present invention may be further subjected to the conventional pore-sealing treatment and/or the finish clear coating, an occasion demands.

The pigment, which is incorporated in the oxide film colored by the method of this invention, as clearly noted from the curve indicating the carbon concentration in the graph of the linear analysis by the EPMA given in the accompanying drawing, is deposited in the pores of the oxide film to the deepest recesses thereof. As a result, the method is capable of producing a brightly colored film which keeps the pigment in the colored oxide film from ready removal as by friction and, therefore, excels in fastness and durability. Since the oxide film can be colored to a varying desired color such as red, black, and blue by selecting the kind of pigment to be used, this invention sufficiently meets the needs for wide variation in color of the colored articles of aluminum. The method heretofore developed for coloration of aluminum with a pigment has not been reduced to practical use. This invention has conferred feasibility upon this method and, therefore, may well be called an achievement of extremely high economic utility.

Now, this invention will be described more specifically below with reference to working examples. As a matter of course, this invention is not limited to the following examples. It ought to be easily understood by any person of ordinary skill in the art that this invention allows various modifications within the scope of the spirit of this invention.

EXAMPLE 1

An industrial grade pure aluminum plate (JIS A1050P-H24, 50 ×20 mm in size) was pretreated as conventionally practiced and then subjected to constant-voltage electrolysis at DC 160 V in a 5% oxalic acid bath at 30° C. for five minutes to form an anodic oxide film thereon with a thickness of 10 μm. Then, the aluminum plate was subjected to electrophoresis using this aluminum plate as an anode at DC 60 V in a bath of an aqueous dispersion of 10% carbon black at 25° C. for one minute to give rise to an anodic oxide film of aluminum brightly colored in black. A carbon electrode identical in size with the anode was used as a cathode. The colored oxide film consequently obtained excelled in fastness and durability.

The aqueous dispersion of carbon black had been obtained by preparing an aqueous solution containing 100 g of carbon black and 5 g as solids of sodium polyacrylate as a dispersant per 1 liter of the solution and by stirring this aqueous solution in a sand mill for five hours. The average particle diameter of the carbon black in the aqueous dispersion was 60 nm.

EXAMPLE 2

The aforementioned industrial grade pure aluminum plate was pretreated as conventionally practiced and then subjected to constant-voltage electrolysis at DC 160 V in a mixed aqueous solution of 5% oxalic acid—10% phosphoric acid at 30° C. for 10 minutes to form an anodic oxide film thereon with a thickness of 10 μm. Then, the aluminum plate was subjected to electrophoresis in an aqueous dispersion of 10% carbon black at 25° C. in the same manner as in Example 1, to give rise to an anodic oxide film of aluminum colored in black.

EXAMPLE 3

The aforementioned industrial grade pure aluminum plate was pretreated as conventionally practiced and then subjected to constant-voltage electrolysis at DC 150 V in a bath of 0.3% oxalic acid at 20° C. for six minutes to form an anodic oxide film thereon with a thickness of 10 μm. Then, the aluminum plate was kept immersed in an aqueous 5% phosphoric acid solution for a varying duration in the range between 0 and 300 minutes to enlarge the pores in the oxide film. The aluminum plate was subsequently subjected to electrophoresis using this aluminum plate as an anode in the same aqueous dispersion of 10% carbon black at 25° C. as used in Example 1 under the conditions shown in Table 1, to give rise to an anodic oxide film of aluminum colored in black. A carbon electrode identical in size with the anode was used as a cathode. The results are shown in Table 1. The colored oxide film obtained in the test run using 100 minutes' immersion for enlarging the pores in the oxide film was subjected to the analysis for carbon in the oxide film by the EPMA. The graph showing the results of this linear analysis is shown in the accompanying drawing.

TABLE 1

| Duration of immersion for enlarging pores in oxide film (in bath of 5% H$_3$PO$_4$ at 30° C.) | Coloration by electrophoresis | State of coloration of oxide film |
| --- | --- | --- |
| 0 minute | One minute's application of DC 60 V in aqueous dispersion of 10% carbon black at 25° C. | No coloration |
| 25 minutes | | No coloration |
| 50 minutes | | Black (uneven) |
| 75 minutes | | Black |
| 100 minutes | | Black |
| 70 minutes | Voltage scaning from DC 0 V to DC 70 V (increasing rate: 4 V/s) in the same bath as above | Black |

EXAMPLE 4

An aluminum alloy 63S plate was pretreated as conventionally practiced and then subjected to constant-voltage electrolysis at DC 150 V in a bath of 0.3% oxalic acid at 20° C. for six minutes to form an anode oxide film thereon in a thickness of 10 μm. Then, the aluminum alloy plate was kept immersed in an aqueous 5% phosphoric acid solution at 30° C. for 120 minutes to enlarge the pores in the oxide film. The plate was subsequently subjected to electrophoresis using the plate as an anode at a constant voltage of DC 80 V in one liter of a bath of an aqueous dispersion containing 10% of dioxazine violet at 25° C. to obtain an oxide film colored in purple.

The aqueous dispersion of dioxazine violet had been prepared by adding an aqueous solution of 1% sodium polystyrenesulfonate to 100 g of dioxazine violet to a total volume of one liter and by stirring the resultant solution in a sand mill for 10 hours. In the dispersion, the dioxazine violet particles dispersed therein had an average diameter of 55 nm.

EXAMPLE 5

An aluminum alloy 63S plate was pretreated as conventionally practiced and then treated by following the procedure of Example 3 to form an anodic oxide film and enlarge the pores in the oxide film. The resultant anodized aluminum alloy plate was immersed as an anode in an aqueous dispersion containing 50 g/liter of copper phthalocyanine blue at 30° C. and subjected to electrophoresis at DC 80 V, to give rise to an anodic oxide film colored in blue. A carbon electrode was used as a cathode. The duration of the electrophoresis was two minutes.

The aqueous dispersion of pigment was prepared by dissolving 50 g of copper phthalocyanine blue in 600 ml of 98% sulfuric acid, adding the resultant solution as stirred into 5 liters of an aqueous 0.5% sodium polyacrylate solution thereby inducing precipitation of phthalocyanine particles therein, washing the phthalocyanine particles with water until sulfate radical ceased to exist therein, adjusting the cleaned phthalocyanine particles with sodium hydroxide to pH 9, diluting the pH-adjusted phthalocyanine particles with an aqueous 0.5% sodium acrylate solution to a total volume of one liter, and stirring the aqueous solution with a sand mill for thorough dispersion of the particles. In the produced aqueous dispersion, the copper phthalocyanine blue particles had an average diameter of 50 nm.

EXAMPLE 6

The aforementioned industrial grade pure aluminum plate was subjected to an anodic oxidation in the same manner as in Example 2 and then subjected to electrophoresis in an aqueous dispersion containing 50 g/liter of copper phthalocyanine blue at 30° C. in the same manner as in Example 5, to give rise to an anodic oxide film colored in blue.

EXAMPLE 7

An aluminum alloy 63S plate was pretreated as conventionally practiced and then subjected to constant-voltage electrolysis at DC 150 V in a bath of 0.3% oxalic acid at 20° C. for six minutes to form an anode oxide film thereon in a thickness of 10 μm. The anodized aluminum alloy plate was repeatedly subjected to a composite treatment consisting of one minute's electrolysis at AC 8 V in an aqueous 8% phosphoric acid solution at 25° C. and two minutes' standing therein at AC 0 V for a total period of 30 minutes at enlarge the pores in the oxide film. Subsequently, in the aqueous dispersion containing 50 g/liter of copper phthalocyanine blue and kept at 30° C. which was prepared in the same manner as in Example 5, the aluminum plate disposed as an anode and a carbon electrode as a cathode were operated to effect electrophoresis at a constant voltage of DC 80 V for two minutes, to give rise to an anodic oxide film colored in blue.

EXAMPLE 8

An aluminum alloy 63S plate was pretreated as conventionally practiced and then subjected to constant-voltage electrolysis at DC 150 V in a bath of 0.3% oxalic acid at 20° C. for six minutes to form an anodic oxide film thereon in a thickness of 10 μm. Then, the aluminum alloy plate was kept immersed with an aqueous 5% phosphoric acid solution at 30° C. for a varying duration in the range between 0 and 100 minutes to enlarge the pores in the oxide film. The plate was subsequently subjected to electrophoresis by immersing the plate in the same aqueous dispersion of copper phthalocyanine blue as used in Example 5, increasing the voltage applied from DC 0 V to DC 20 V at the voltage increasing rate of 1 V/sec. and then keeping the voltage at 20 V until the total duration of the electrophoresis reaches 100 seconds. The results are shown in Table 2.

TABLE 2

| Duration of immersion for enlarging pores in oxide film (in bath of 5% H$_3$PO$_4$ at 30° C.) | Coloration by electrophoresis | State of coloration of oxide film |
| --- | --- | --- |
| 0 minute | Voltage scanning from DC 0V to DC 20V (increasing rate: 1 V/sec.) and thereafter 80 seconds of application of DC 20V in aqueous dispersion of 50 g/liter of copper phthalocyanine blue at 30° C. | No Coloration |
| 20 minutes | | No coloration |
| 40 minutes | | Light blue |
| 60 minutes | | Light blue |
| 80 minutes | | Blue |
| 100 minutes | | Blue |

EXAMPLE 9

An aluminum alloy 63S plate was treated by faithfully repeating the procedure of Example 5, excepting 50 g/liter of quinacridone red was used in the place of copper phthalocyanine blue in the aqueous dispersion, to produce an anodic oxide film colored in red. In the aqueous dispersion, quinacridone particles had an average diameter of 70 nm.

EXAMPLE 10

On an aluminum alloy 63S plate, an anodic oxide film colored in green was produced by faithfully following the procedure of Example 5, excepting highly chlorinated copper phthalocyanine green was used in the place of copper phthalocyanine blue and formalin condensate of sodium naphthalenesulfonate was used in the place of sodium polyacrylate as a dispersant in the aqueous dispersion.

What we claim is:

1. A method of producing a colored article of aluminum or an aluminum alloy, comprising the steps of anodizing said aluminum or aluminum alloy at high voltage in the range between DC 150 V and 200 V in an aqueous solution of at least one acid selected from among mineral acids and organic acids thereby forming on a surface of said aluminum or aluminum alloy a porous anodic oxide film which contains pores having a diameter in the range between 50 and 200 nm, immersing the anodized aluminum or aluminum alloy in an aqueous dispersion of an organic pigment finely divided into particles of a size in the range between 3 and 150 nm and dispersed in an aqueous medium, and then subjecting the anodized aluminum or aluminum alloy to an electrophoretic treatment to cause the organic pigment to be migrated and deposited in the pores of the anodic oxide film thereby obtaining the colored article of aluminum or aluminum alloy.

2. A method according to claim 1, wherein said electrophoretic treatment is carried out by a DC voltage scanning method which consists in continuing electrolysis while increasing a DC voltage from 0 V to a voltage in the range between 1 and 200 V at a voltage increasing rate of from 0.1 to 5 V/sec., a DC constant-voltage method which consists in continuing electrolysis at a constant voltage in the range between 1 and 200 V, or a combination thereof.

3. A method according to claim 1, wherein said organic pigment is selected from the group of condensed azo type pigments, phthalocyanine type pigments, and condensed polycyclic type pigments.

4. A method according to claim 1 wherein said aqueous dispersion of the organic pigment is prepared by dispersing the pigment particles in an aqueous medium with a sand mill using an anionic high-molecular surface-active agent as a dispersant.

5. A method according to claim 4, wherein said anionic high-molecular surface-active agent is selected from the group of a formalin condensate of naphthalenesulfonic acid, polystyrene sulfonates, and polyacrylates.

6. A method according to claim 1, wherein said aqueous dispersion of the organic pigment is prepared by dissolving the pigment in concentrated acid, adding the resultant solution to an aqueous medium thereby inducing precipitation therein of pigment particles of a smaller size, and then dispersing the pigment particles in the aqueous medium with a sand mill using an anionic high-molecular surface-active agent as a dispersant.

* * * * *